United States Patent
Lindbergh

(10) Patent No.: US 8,654,950 B2
(45) Date of Patent: Feb. 18, 2014

(54) METHOD AND APPARATUS FOR AUTOMATICALLY SUPPRESSING COMPUTER KEYBOARD NOISES IN AUDIO TELECOMMUNICATION SESSION

(75) Inventor: David Jordan Lindbergh, Reading, MA (US)

(73) Assignee: Polycom, Inc., San Jose, CA (US)

( * ) Notice: Subject to any disclaimer, the term of this patent is extended or adjusted under 35 U.S.C. 154(b) by 1745 days.

(21) Appl. No.: 11/745,510

(22) Filed: May 8, 2007

(65) Prior Publication Data

US 2008/0279366 A1    Nov. 13, 2008

(51) Int. Cl.
*H04M 3/42* (2006.01)
*H04M 11/00* (2006.01)
*H04M 1/00* (2006.01)
*H04L 12/16* (2006.01)
*H04Q 11/00* (2006.01)
*H04N 7/14* (2006.01)
*B41J 5/00* (2006.01)

(52) U.S. Cl.
USPC .................. 379/202.01; 379/93.21; 379/158; 379/201.01; 370/260; 455/416; 400/472

(58) Field of Classification Search
USPC ............... 379/202.01, 392.01, 90.01, 93.01, 379/93.21, 157, 158, 201.01, 207.01; 370/259, 260, 261, 262; 455/414.1, 455/416; 400/472
See application file for complete search history.

(56) References Cited

U.S. PATENT DOCUMENTS

| | | | |
|---|---|---|---|
| 6,935,797 B2 * | 8/2005 | Sim ............................... | 400/472 |
| 2004/0087318 A1 * | 5/2004 | Lipovski .................... | 455/456.4 |
| 2008/0076410 A1 * | 3/2008 | Beyer ........................... | 455/425 |

\* cited by examiner

*Primary Examiner* — Khai N Nguyen
(74) *Attorney, Agent, or Firm* — Wong, Cabello, Lutsch, Rutherford & Brucculeri, L.L.P.

(57) ABSTRACT

A communication system automatically mutes a microphone in response to a key event detected from a coupled keyboard to prevent delivery of noise generated by the keyboard to a far end of the communication session. A timer is initiated for a time period when the key event occurs, and the microphone remains muted for the time period of the timer. The timer may be restarted to maintain the microphone mute in response to a subsequent key event detected while the timer is running. If the timer expires before a subsequent key event is detected, the microphone can be restored to its previous state (usually un-muted). The system can be applied to a computer coupled to the keyboard and a microphone and having a communication application operating on the computer. Alternatively, the system can be applied to a computer coupled to the keyboard and coupled to an external conferencing unit having a communication application.

20 Claims, 3 Drawing Sheets

METHOD AND APPARATUS FOR AUTOMATICALLY SUPPRESSING COMPUTER KEYBOARD NOISES IN AUDIO TELECOMMUNICATION SESSION

FIELD OF THE DISCLOSURE

The subject matter of the present disclosure relates to a method and apparatus for automatically suppressing noises generated from a computer keyboard during an audio telecommunication session.

BACKGROUND OF THE DISCLOSURE

Increasingly, general-purpose computers, such as desktop and laptop computers, are being used during audio telecommunication sessions, such as telephony, voice chat, teleconferencing, and videoconferencing sessions. In one arrangement, an existing system uses a computer to control conferencing operations (directly or indirectly, for example through a Web site), to present slides, to make notes available to the participants, etc. In another arrangement, the computer actually implements the functions of a conferencing or telephony system by processing audio signals from microphones, encoding and decoding audio, generating output to loudspeakers or earpieces, etc.

Because computers are being increasingly used, one of the participants will often be typing on the computer keyboard during the communication session. Typing on the keyboard usually generates noise that is perceived as objectionable, annoying, and distracting during a conversation. These typing noises are picked up by the conferencing equipment's microphone(s) and sent to the far end participants. The problem with these typing noises can be particularly acute when the microphone is physically attached to or part of the computer used for desktop conferencing or when the microphone is positioned on the same surface as the computer. In these situations, there may be strong mechanical and acoustic coupling between the computer keyboard and the microphone such that loud keyboard noises may be transmitted to the far-end.

Consequently, there is a need for a method or apparatus for reducing noise generated by a participant typing on a computer keyboard during a communication session.

SUMMARY OF THE DISCLOSURE

In one embodiment, an audio telecommunication system automatically mutes a microphone in response to a key event (e.g., a key-strike, a key-release, or both) detected from a coupled keyboard to prevent or reduce delivery of noise from the keyboard to a far end of the communication session. When the key event is detected, the microphone is muted, and a timer is started. While the timer runs, a subsequent key event detected by the system re-starts the timer and thereby extends the microphone's mute period. If the timer expires before a subsequent key event is detected, however, the system restores the microphone to its original state (muted or unmuted). Thus, the voice communication system automatically mutes the microphone(s) when any key is pressed and keeps the microphone muted for a period thereafter. If additional keys are pressed before the period expires, the mute period is extended for a further time period from when the last key was pressed. After the mute period has elapsed without any keystrokes, the microphone is automatically restored to its prior state (usually un-muted). The communication system can include a computer executing a communication application and coupled to both the keyboard and the microphone. Alternatively, the voice communication system can include a computer coupled to an external communication unit, such as a conferencing unit, that executes the communication application and is coupled to the microphone.

DETAILED DESCRIPTION

Figure 1:
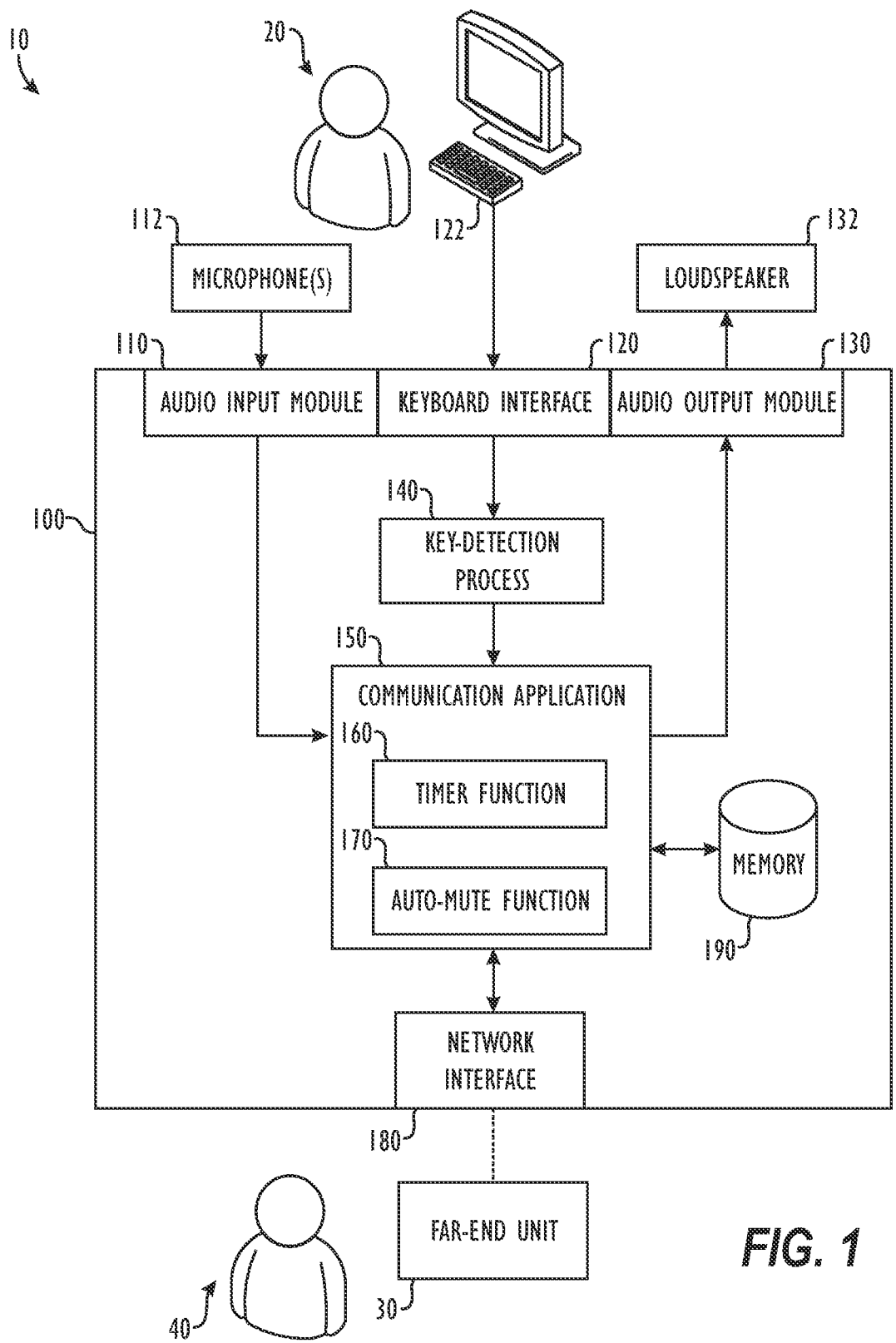
FIG. 1 illustrates one embodiment of a communication system according to certain teachings of the present disclosure.

FIG. 1 illustrates an audio telecommunication system 10 that can be used in an audio telecommunication session, such as a telephone conference, voice chat, videoconference, or desktop conference, for example. The system 10 includes a computer 100 coupled to a microphone 112 and a keyboard 122. During the communication session, one or more near-end participants 20 may speak from time to time. The microphone 112 picks up the speech, and an audio input module 110 of the computer 100 receives the speech as near-end audio. A communication application 150 processes the near-end audio and sends it via a network interface 180 to a far-end communication unit 30 where a far-end participant 40 can hear the audio. Likewise, the network interface 180 receives far-end audio from the far-end unit 30, and the communication application 150 processes the far-end audio and sends the output to a loudspeaker 132 via an audio output module 130.

The audio input module 110, microphone 112, audio output module 130, loudspeaker 132, and network interface 180 can all be conventional components of the computer 100 so they are not described in detail here. The communication application 150, in one example, can be a desktop conferencing application that runs on the computer 100. In other examples, the communication application can be a telephony application known in the art, such Skype™, AIM®, Google Talk®, Microsoft® NetMeeting®, or Microsoft® Messenger, etc., running on the computer.

One of the near-end participants 20 may type during the communication session and generate typing noises. If the typing noises are sent to the far-end unit 30, the far-end participant 40 may find the noises disruptive or distracting. To reduce or eliminate the effects of typing noises, the system 10 includes a timer function 160 and an auto-mute function 170. In the present embodiment, these functions 160 and 170 are shown as being part of the communication application 150, but they could alternatively be incorporated into other parts of the system 10.

These functions 160 and 170 work in conjunction with another process 140 executing on the computer 100 that detects key events. For example, this process 140 can be an operating system process that is communicatively coupled to the computer's keyboard 122 via a keyboard interface 120 and which can detect key events from the keyboard 122. In general, the key events can include a key-strike and/or a key-release.

Figure 2:
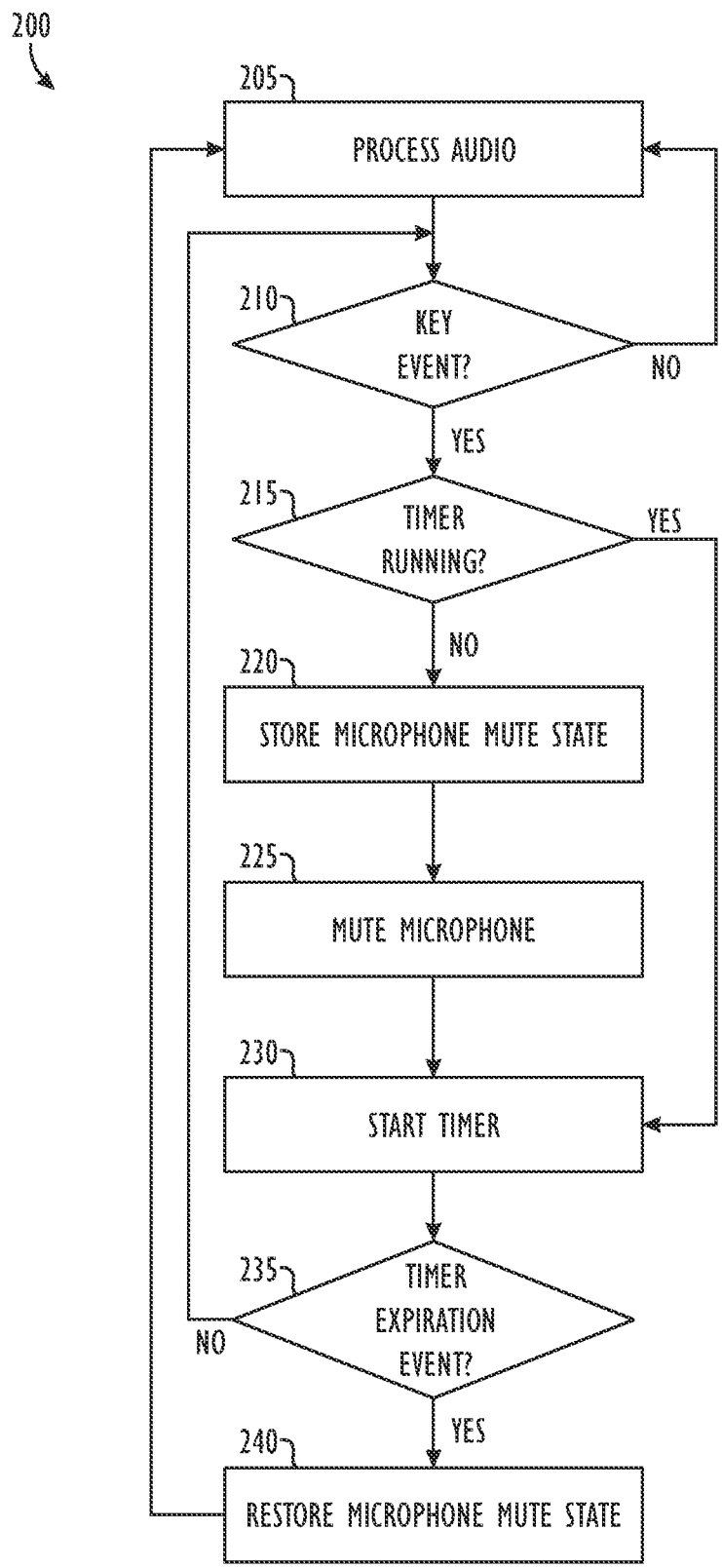
FIG. 2 illustrates one embodiment of a noise reduction process for the communication system of FIG. 1.

FIG. 2 illustrates a process 200 that uses the components of FIG. 1 to reduce the effects of typing noises during the communication session. Although the process 200 is typically event driven, it is illustrated in flowchart form for the purposes of discussion. One skilled in the art will appreciate with the benefit of the present disclosure that there may be several variations on the above process 200. In general, the process 200 relieves a participant from the need to manually mute and un-mute a microphone to avoid sending keyboard noises to other participants in a communication session and prevents accidental typing noises from being transmitted if the participant were to forget to mute the microphone manually.

During the communication session, the computer 100 receives near-end audio from the microphone 112 via the audio input module 110 and processes that audio (Block 205). At any given time, the near-end audio may or may not include typing noises or speech. If a near-end participant is typing on the keyboard 122, however, the noise from the keyboard would become part of the near-end audio picked up by the microphone 112 if allowed. To prevent this, the communication application 150 uses the key-detection process 140 coupled to the keyboard 122 to detect each time a key event occurs on the keyboard 122 (Block 210). For most operating systems, such a key-detection process 140 can detect key events using techniques known in the art.

In response to the detected key event, the timer function 160 determines if the count-down timer T is already running (Decision 215). If running, the timer function 160 simply restarts the timer T with a new mute period P in response to this newly detected key event (Block 230). If not already running (e.g., this is the first detected key event after some period of time), then the current state (mute on or off) of the microphone 112 can be stored in memory 190, if desired for later use 190 (Block 220). Next, the auto-mute function 170 mutes the microphone 112 (Block 225), and the timer function 160 starts the count-down timer T running for a mute period P (Block 230).

While the timer T is running, the auto-mute function 170 continually awaits a timer expiration event to occur that indicates when the mute period P has expired (Decision 235). The mute period P is preferably as short as possible yet long enough to mute the sound of the keystroke. In one example, the mute period P can be in the range of 100 to 1000 milliseconds, but the actual value may vary and may depend on various factors, such as the particular noisiness of the keyboard, typing habits/skills of the typist, and the response time of the system. In general, it is desirable to have the mute period be short enough that the microphone 112 un-mutes quickly when typing stops but long enough that it doesn't un-mute in the middle of a single "burst" of typing. In this regard, the particular value for the mute period P may vary based on the typing habits/skills of the typist. For example, the mute period may be a larger value of about 500-ms to 1 second for some typists but shorter for others. As opposed to being a preset and unadjustable value, the mute period P may be adjustable by the user or the system. Moreover, as opposed to being fixed once set, the mute period P may dynamically vary using dynamic adaptation to account for typing styles, keyboard, etc.

If a termination event has not been generated because the mute period P has yet to expire, the process 200 returns to Decision 210 to detect if any subsequent key event occurs, while continuing to monitor for the mute period P to expire. Eventually, the mute period P will expire after the participant has stopped typing on the keyboard. Once expired, the communication application 150 can restore the microphone 112 to its previous state (usually un-muted), which may have been stored in memory 190 (Block 240), and the process 200 can then continue processing audio (Block 205) and detecting for key events (Block 210).

It will be appreciated that an initial portion of noise from the very first keystroke in a sequence of keystrokes may not be eliminated entirely because the keystroke noise starts roughly simultaneously with the keystroke detection. However, some of the noise from even the first keystroke can be prevented from being transmitted to the far-end because the response of the computer 100 to the first keystroke can be very fast. In any event, the initial portion of noise may not be substantial, and most of any remaining noise for this first keystroke and all the noise from subsequent keystrokes can be eliminated with the process 200. In addition, it will be appreciated that reference to muting the microphone 112 may mean that the computer 100 still receives audio signals from the microphone 112 but that the auto-mute function 170 does not allow the audio to be sent to the far end. Alternatively, the system 10 may actually permit the audio signal to reach the far-end but may send a message to a decoder at the far-end decoder instructing it when to mute its loudspeaker.

In some implementations, the participant may be allowed to override or modify the mute state of the microphone 112 by selecting a manual mute button. If the participant presses the manual mute button while the auto-mute is in effect, the system 10 may simply ignore the selection because the auto-mute function 170 will restore the mute state to where it was at the start of the mute period. Alternatively, the system 10 may postpone changing the live mute state of the microphone 112 as selected by the mute button until after the mute period P expires, or the system 10 may instead modify the stored mute state rather than change the live mute state of the microphone 112.

Figure 3:
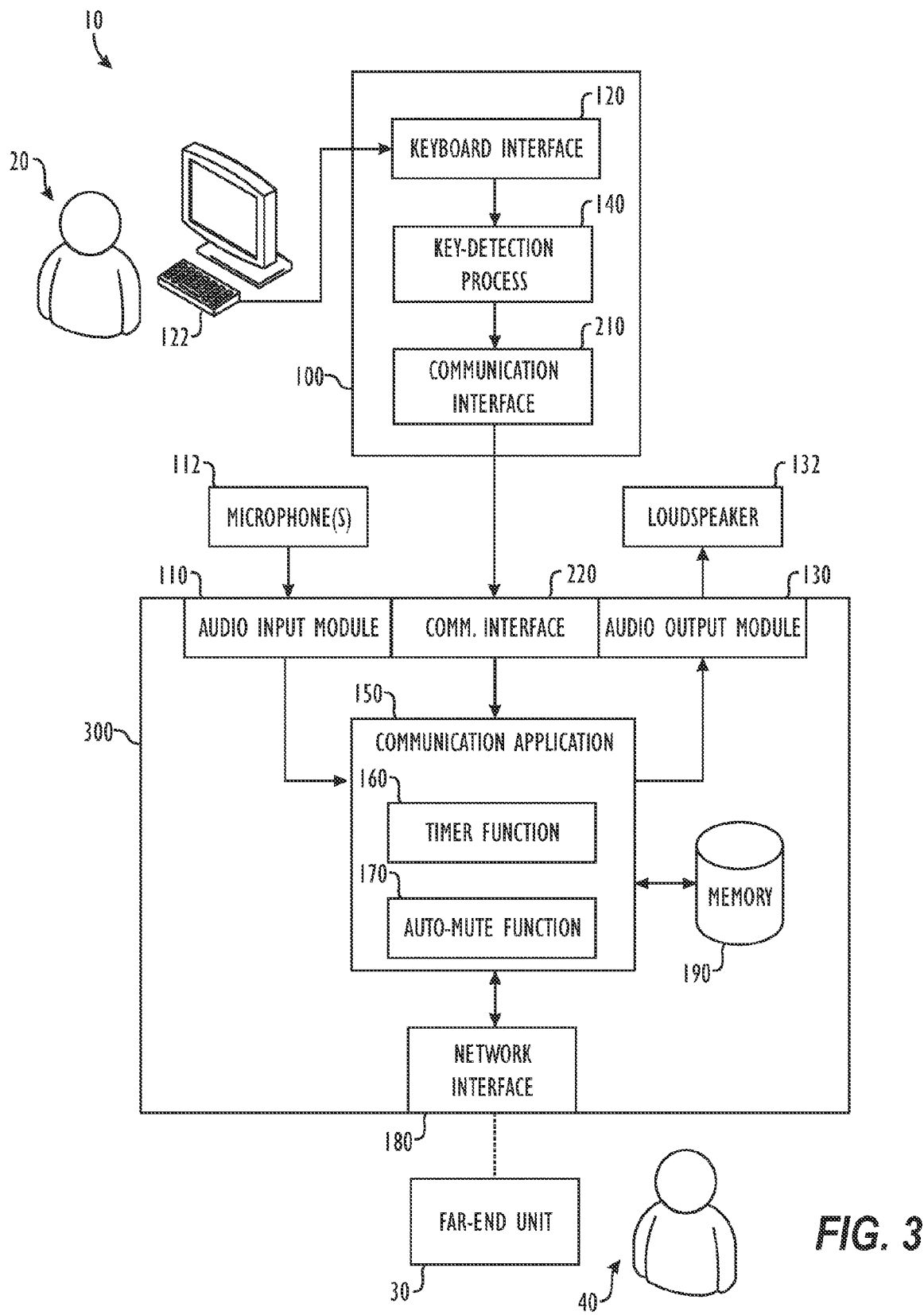
FIG. 3 illustrates another embodiment of a communication system according to certain teachings of the present disclosure.

Although the embodiment of FIG. 1 shows the communication application 150 running on the computer 100, the application 150 may run on external telephony equipment, such as a conferencing unit, coupled to the computer 100. FIG. 3 shows the communication system 10 having the computer 100 coupled to an external telephony device 300, which can be, for example, one of Polycom's VSX series conferencing units or other products. Reference numerals in FIG. 3 are the same as used in FIG. 1 to show like components. Thus, the telephony device 300 has the audio input module 110, audio output module 130, communication application 150, and network interface 180 with the far end, while the computer 100 has the keyboard interface 120 and the key-detection process 140.

Communication interfaces 310 and 320 between the computer 100 and the telephony device 300 allow the computer 100 to send information about key events to the communication application 150. The communication interfaces 310 and 320 can use a cable connection, an Ethernet or wireless network connection, or other type of connection. In response to detected key events, the communication application 150 of the telephony device 300 can then control the mute state of the microphone 112 according to the keyboard noise suppression techniques disclosed herein. In this way, the disclosed techniques can be applied to cases where a computer having the keyboard generating the noise is either the same computer running the communication application (as in FIG. 1) or is coupled to external telephony equipment in such a way as to be able to send information about keystrokes to the telephony equipment (as in FIG. 3).

The disclosed keyboard noise suppression techniques can be ultimately coded into a computer program and stored on a computer-readable media, such as a compact disk, a tape, stored in a volatile or non-volatile memory, etc. Accordingly, instructions stored on a program storage device can be used to cause a programmable control device (e.g., computer or conferencing unit) to perform the keyboard noise suppression techniques disclosed herein. Although the disclosed communication system has been described as providing bi-directional communication between a near end and a far end, it will be appreciated that the teachings of the present disclosure are applicable to systems that provide one-way audio transmission where keyboard noises might be present (for example, a radio broadcast, podcast, etc.).

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. An automatic keyboard noise suppression method for a communication session, comprising:
   receiving input audio from a microphone;
   sending output audio to a far-end;
   receiving a key event detected from a computer keyboard;
   storing a current state of the microphone in response to the key event;
   initiating a timer in response to the detected key event;
   automatically disabling the sending of input audio from the microphone to the far-end during the timer to substantially prevent noise generated by the keyboard from being delivered to the far-end; and
   returning the microphone to the stored state after the timer has expired,
   wherein the microphone returns to mute after the timer has expired when the stored state at the detected key event is a mute state, and
   wherein the microphone returns to un-mute after the timer has expired when the stored state at the detected key event is an un-mute state.

2. The method of claim 1, wherein the key event comprises a key-strike, a key-release, or both.

3. The method of claim 1, further comprising awaiting detection of a subsequent key event while the timer runs.

4. The method of claim 3, further comprising reinitiating a new time period for the timer in response to a subsequent key event detected while the timer is currently running.

5. The method of claim 3, further comprising automatically enabling the sending of input audio from the microphone to the far-end if the timer expires before a subsequent key event is detected.

6. The method of claim 1, wherein receiving a key event detected from a computer keyboard comprises:
   detecting the key event with a process running on a computer coupled to the computer keyboard; and
   providing the detected key event to a communication application capable of muting and un-muting audio received by the microphone.

7. The method of claim 6, wherein the communication application is running on the computer.

8. The method of claim 6, wherein the communication application is running on telephony equipment communicatively coupled to the computer.

9. The method of claim 1, further comprising receiving a manual muting of the microphone and storing the current state of the microphone as muted.

10. A program storage device, readable by a programmable control device, comprising instructions stored on the program storage device for causing the programmable control device to perform a method according to claim 1.

11. A computer, comprising:
   an input interface receiving input audio from a microphone;
   an output interface sending output audio to a far-end in a communication session;
   a device interface coupled to a keyboard; and
   a communication application executing on the computer and in communication with the input interface, the output interface, and the device interface, the communication application initiating a timer and storing a current state of the microphone in response to a detected key event from the device interface, the communication application automatically disabling the sending of input audio from the microphone to the far-end during the timer to prevent sending substantial keyboard noises to the far-end in the communication session,
   wherein the communication application returns the microphone to mute after the timer has expired when the stored state at the detected key event is a mute state, and
   wherein the communication application returns the microphone to un-mute after the timer has expired when the stored state at the detected key event is an un-mute state.

12. The computer of claim 11, wherein the communication application automatically enables the sending of input audio from the microphone if the timer expires before a subsequent key event is detected.

13. The computer of claim 11, wherein the communication application restarts the timer to a new time period in response to a subsequent key event detected while the timer is still running.

14. The computer of claim 11, wherein the communication application receives a manual muting of the microphone and stores the current state of the microphone as muted.

15. A telephony device, comprising:
   an input interface receiving input audio from a microphone;
   an output interface sending output audio to a far-end in a communication session;
   a communication interface coupled to a computer having a keyboard and receiving a key event detected from the keyboard by the computer; and
   a communication application executing on the telephony device and in communication with the input interface, the output interface, and the communication interface, the communication application initiating a timer and storing a current state of the microphone in response to a detected key event from the communication interface, the communication application automatically disabling the sending of input audio from the microphone to the far-end during the timer to prevent sending keyboard noises to the far-end in the communication session,
   wherein the communication application returns the microphone to mute after the timer has expired when the stored state at the detected key event is a mute state, and
   wherein the communication application returns the microphone to un-mute after the timer has expired when the stored state at the detected key event is an un-mute state.

16. The telephony device of claim 15, wherein the telephony device is a conferencing unit.

17. The telephony device of claim 15, wherein the communication application automatically enables the sending of input audio from the microphone if the timer expires before a subsequent key event is detected.

18. The telephony device of claim 15, wherein the communication application restarts the timer to a new time period in response to a subsequent key event detected while the timer is still running.

19. The telephony device of claim 15, wherein the communication application receives a manual muting of the microphone and stores the current state of the microphone as the mute state in response to the detected key event.

20. An automatic keyboard noise suppression method for a communication session between a near-end unit and a far-end unit, comprising:
- receiving near-end audio from a microphone at the near-end unit;
- sending the near-end audio from the near-end unit to the far-end unit;
- receiving a key event detected from a computer keyboard at the near-end unit during the sending of the near end audio, the key event indicative of keyboard noise in the near end audio; and
- sending, in response to the detected key event, a message from the near-end unit to the far-end unit instructing the far-end unit to disable output of the near-end audio at the far-end unit at least during the detected key event.

\* \* \* \* \*